(12) United States Patent
Rodemerck et al.

(10) Patent No.: US 7,033,558 B2
(45) Date of Patent: Apr. 25, 2006

(54) METHOD FOR ELIMINATING TRACES OF HYDROCARBONS FROM GAS STREAMS

(75) Inventors: Uwe Rodemerck, Berlin (DE); Peter Ignaszewski, Berlin (DE); Peter Claus, Berlin (DE); Olga Gerlach, Ludwigshafen (DE); Manfred Baerns, Berlin (DE); Dorit Wolf, Berlin (DE)

(73) Assignee: Institut fuer Angewandte Chemie Berlin-Aldershof e.V., (DE)

( * ) Notice: Subject to any disclaimer, the term of this patent is extended or adjusted under 35 U.S.C. 154(b) by 167 days.

(21) Appl. No.: 10/333,335

(22) PCT Filed: Jul. 19, 2001

(86) PCT No.: PCT/DE01/02789

§ 371 (c)(1),
(2), (4) Date: Jan. 17, 2003

(87) PCT Pub. No.: WO02/07878

PCT Pub. Date: Jan. 31, 2002

(65) Prior Publication Data

US 2003/0161775 A1    Aug. 28, 2003

(30) Foreign Application Priority Data

Jul. 20, 2000   (DE) ................ 100 37 165

(51) Int. Cl.
*B01J 23/46*    (2006.01)
*B01D 53/86*    (2006.01)
*B01D 53/94*    (2006.01)

(52) U.S. Cl. ............. 423/245.3; 423/212; 423/213.5
(58) Field of Classification Search ............ 423/245.1, 423/245.3, 246, 247, 212, 213.2, 213.7
See application file for complete search history.

(56) References Cited

U.S. PATENT DOCUMENTS

| | | | |
|---|---|---|---|
| 3,257,163 A * | 6/1966 | Stiles ............... 423/213.7 |
| 3,891,575 A | 6/1975 | Brautigam et al. |
| 3,910,770 A * | 10/1975 | Kobylinski et al. ....... 422/172 |
| 3,965,040 A * | 6/1976 | Kobylinski et al. ....... 502/213 |
| 4,018,706 A * | 4/1977 | Inoue et al. ............. 502/248 |
| 4,077,913 A * | 3/1978 | Acres et al. ............. 502/302 |
| 4,188,364 A * | 2/1980 | Gladden ................ 423/213.2 |
| 6,458,334 B1 * | 10/2002 | Tamhankar et al. ...... 423/418.2 |

FOREIGN PATENT DOCUMENTS

| DE | 23 51 237 | 4/1975 |
|---|---|---|
| EP | 0 682 975 A1 | 11/1995 |

OTHER PUBLICATIONS

W. Weisweiler, S. Kureti, A. Kindtner Lachgas-Zersestung bei der durch Platinmetalle katalysierten Stickoxid-Reduktion aus sauerstoffhaltigen Pkw-Motorabgasen; Jul. 1998, pp. 7, 21, 34, 41.
L. D. Pfefferle and W.C. Pfefferle Catalysis in Combustion 1987, pp. 219-267.
A O'Malley, B. K. Hodnett The influence of volatile organic compound structre on conditions requried for total oxidation 1999 pp. 31-38.
Yoshihiko Moro-Oka, Yutaka Morikawa, and Atsumu Ozaki Regularity in the Catalytic Properties of Metal Oxides in Hydrocarbon Oxidation 1967 pp. 23-32.
Yung-Fang Yu Yao Oxidation of Alkanes over Noble Metal Catalysts 1980 pp. 293-298.
Jean-Marie Herrmann, Can Hoang-Van, Lucie Dibansa, and Rondronirina Harivololona An In Situ Electrical Conductivity Studey of a $CeO^2$ Aerogel Supported Palladium Catalyst in Correlation with the Total Oxidation of Propane 1996 pp. 361-367.
A. Schlangen, Gerd W. Neuhaus, Maria Madani, and Wilhelm F. Maier Unterschiede in der Totaloxidation organischer Verbindungen an heterogenen Platinum—und Palladiumkatalysatoren 1992 pp. 465-473.

* cited by examiner

*Primary Examiner*—Ngoc-Yen Nguyen
(74) *Attorney, Agent, or Firm*—Pendorf & Cutliff

(57) ABSTRACT

The invention refers to a method for removing traces of hydrocarbons, particularly propane, from gas flows. The conversion of hydrocarbons into carbon oxides is achieved by loading suitable carrier materials, such as e.g. $TiO_2$ or $Al_2O_3$, with ruthenium as active component, possibly doping them with one or more further element(s), and subsequently calcining and/or reducing them at an increased temperature. By means of these catalysts, and at 20 to 150° C. and while adding molecular oxygen, hydrocarbons, particularly propane, in concentrations ranging from 0.1 to 2,000 ppm are oxidized.

9 Claims, No Drawings

METHOD FOR ELIMINATING TRACES OF HYDROCARBONS FROM GAS STREAMS

CROSS REFERENCE TO RELATED APPLICATION

This application is a national stage of PCT/DE01/02789 filed Jul. 19, 2001 and based upon DE 100 37 165.5 filed Jul. 20, 2000 under the International Convention.

The invention refers to a catalytic process for removing traces of hydrocarbons, particularly propane, from gas flows.

Catalysts for the total oxidation of hydrocarbons, which catalysts usually contain the platinum group metals platinum and palladium, possibly also rhodium, have been described already (J. Catal. 7 (1967) 23, Catal. Today 54 (1999) 31, Ind. Eng. Chem. Prod. Res. Dev. 19 (1980) 293, J. Catal. 159 (1996) 361, J. prakt. Chem. 334 (1992) 465, U.S. Pat. No. 5,915,951). All these catalysts known so far have in common that they are active at temperatures of approx. 250° C. and above only. There are no known catalysts which convert hydrocarbons into carbon oxides at room temperature already (Catal. Rev.-Sci. Eng. 29 (1987) 219). In a Japanese patent (JP 9113486), a method is described in which hydrocarbons can be converted at 100–150°C. using high-voltage discharge coupled with a Pt catalyst. However, this method requires a lot of effort.

EP-A-682975 refers i.e. to a mixed catalyst from Ag and Rh for removing of nitric oxids, co and hydrocarbons at temperatures of 150–650° C. U.S. Pat. No. 4,350,237 refers to the cataylic purifying of exhaust gases at temperatures of 200° C. DE-A-235137 describes mixed catalysts from i.e. Pt and Rh dor the purifying of exhaust gases with working temperatures of 500° C. U.S. Pat. No. 3,931,050 describes mixed catalysts from Pt and Rh for removing nitric oxides which catalysts are tested at temperatures at 720° C. Weisweiler et al. (http://bwplus.fzk.de/berichte/Sber/PEF39005Sber.pdf) describes a catalytic decomposition of laughing gas.

The object of the invention is to provide a method in which propane and other hydrocarbons small amounts of which are contained in gas flows can be converted into carbon oxides, preferably carbon dioxide, at low temperatures already.

According to the invention, the method for removing traces of hydrocarbons from gas flows is characterized in that a gas flow containing traces of hydrocarbons in the range of 0.1 to 2,000 ppm is made to pass over a catalyst having a specific BET surface of 1 to 1,500 m$^2$/g while adding molecular oxygen and at a temperature in the range of 20 to 150° C., wherein the said catalyst, on the surface of an open-pore, oxidic base body, contains compounds containing ruthenium, and wherein the ruthenium content is 0.1 to 20% by weight relative to the total weight of the catalyst.

The catalyst consists of an open-pore, oxidic carrier material having a specific BET surface of 1 to 1,500 m$^2$/g, which material, on its surface, comprises compounds containing ruthenium, and wherein the ruthenium content is 0.1 to 20% by weight relative to the total weight of the catalyst.

Advantageously, the carrier material is selected from the group consisting of titanium dioxide, titanium silicalite, aluminium oxide, alumosilicates, manganese oxides, magnesium oxide, acid zirconium dioxide and mixtures thereof, and TiO$_2$ consisting of the modification Anatas in the amount of 20–100% by weight is particularly preferred.

In another preferred embodiment, the carrier material is Al$_2$O$_3$.

Advantageously, the ruthenium content is in the range of 0.5 to 10% by weight, particularly preferred in the range of 0.5 to 5% by weight, and particularly in the range of 0.5 to 3% by weight.

In addition to ruthenium, the catalyst may carry elements on the catalyst surface which are selected from the group consisting of platinum, palladium, rhodium, gold, rhenium, bismuth, tellurium, lead, molybdenum, manganese, germanium, chromium, zinc, lanthanum, rare earth metals and combinations thereof. It has been found that by means of such additives improved activities in the removal of small amounts of hydrocarbons from gas flows could be achieved.

Particularly preferred additional elements, besides ruthenium, on the catalyst surface are bismuth, lead, molybdenum, manganese, tellurium and chromium, alone or in combination with each other.

The catalyst is manufactured by applying ruthenium solutions onto the catalyst surface, drying the catalyst precursor at temperatures in the range of 20 to 120° C., calcining the catalyst precursor in the presence of oxygen at a temperature in the range of 200 to 600° C., and reducing the catalyst in a hydrogen atmosphere at temperatures of 200 to 400° C., or calcining and reducing under the said conditions.

In doing so, ruthenium(III) acetyl acetonate or aqueous ruthenium(III) chloride are preferably used as ruthenium solution.

Before drying, solutions of metal compounds may be applied, either at the same time as the ruthenium solution or one after another, which metals are selected from the group consisting of platinum, palladium, gold, bismuth, tellurium, lead, molybdenum, manganese, rhodium, rhenium, germanium, chromium, zinc, lanthanum, rare earth metals and combinations thereof.

In the method according to the invention, a preferred hydrocarbon content is 10 to 2,000 ppm, and a preferred hydrocarbon is propane, for example.

Advantageously, the propane may be contained in the gas flow in a concentration of 0.1 to 1,000 ppm, particularly 10–1,000 ppm. The temperature at which the gas flow containing propane is brought in contact with the catalyst is particularly in the range of 50 to 150° C.

Preferably, the gas flow consists of air, or it contains air, which supplies molecular oxygen. The oxygen content should at least be so high as to guarantee a conversion of the hydrocarbons. It is preferred that the hydrocarbons be converted into carbon dioxide.

It is further preferred that the gas flow does not contain any nitrogen oxides.

Thus, the conversion of hydrocarbons into carbon oxides according to the invention is achieved by loading suitable carrier materials, such as e.g. TiO$_2$ or Al$_2$O$_3$, with ruthenium as active component, doping them with one or more element(s), and subsequently calcining and/or reducing them at an increased temperature. By means of this measure, catalysts are provided which oxidize hydrocarbons, particularly propane, at temperatures of 20 to 150° C. already. For example, at a catalyst containing 3% by weight of ruthenium on titanium dioxide, propane (0.1% by weight in air) is converted into carbon oxides to the degree of 12% at 50° C., to the degree of 30% at 100° C., and to the degree of 81% at 150° C., while the respective degrees of conversion at catalysts which are manufactured in the same way, but contain other platinum group metals, are much lower (Pt: 3, 8 and 21%; Pd: 1, 3 and 14%).

The catalysts show a high activity at low temperatures (50–150° C.) already.

The invention will hereinafter be explained more precisely by means of examples. The surface measurements were carried out according to the BET method (Z.Anal-.Chem. 238, 187 (1968)).

EXAMPLES 1–26

The manufacture of the catalyst precursor was carried out in two steps, wherein single steps or initial compounds do not apply if the respective compounds are not part of the catalyst. First, the porous carrier material $TiO_2$ (Degussa Aerolyst 7710, 0.25–0.5 mm, BET 49 m²/g, pore volume 0.88 ml/g) was impregnated with a mixture of aqueous solutions of the initial compounds $H_2[PtCl_6]$, $H[AuCl_4]$ and $Mn(NO_3)_2$, and dried at 110° C. In a second stage, the materials obtained were impregnated with a mixture of aqueous solutions of the initial compounds $(NH_4)_2PdCl_4$, $RhCl_3$ and $RuCl_3$, and dried again at 110° C. The catalyst precursors manufactured in this way were calcined for 2 hours in an airflow (33 ml/min per 200 mg of catalyst) at 400° C., and subsequently reduced for 2 hours in a hydrogen flow (33 ml/min per 200 mg of catalyst) at 250° C. The catalytic test was carried out using 200 mg of the catalyst and a gas mixture of 0.1% by weight of propane and 20% by weight of $O^2$ in helium at a volume flow of 6 ml/min. Table 1 shows the compositions of the catalysts and the degrees of propane conversion at different reactor temperatures.

TABLE 1a

Catalyst composition for Examples 1–26, carrier material: $TiO_2$ (Degussa Aerolyst)

| Example No. | Active components/% by weight | | | | | |
|---|---|---|---|---|---|---|
| | Ru | Pt | Pd | Rh | Au | Mn |
| 1 | 1.72 | 0 | 0 | 0 | 0 | 1.28 |
| 2 | 2.35 | 0.65 | 0 | 0 | 0 | 0 |
| 3 | 1.00 | 0 | 0 | 1.10 | 0.91 | 0 |
| 4 | 1.40 | 0 | 0 | 1.60 | 0 | 0 |
| 5 | 2.41 | 0 | 0.59 | 0 | 0 | 0 |
| 6 | 1.93 | 1.07 | 0 | 0 | 0 | 0 |
| 7 | 1.66 | 0 | 0 | 0 | 1.34 | 0 |
| 8 | 1.17 | 0.20 | 0 | 1.15 | 0.47 | 0 |
| 9 | 1.33 | 0.24 | 0 | 0.76 | 0 | 0.67 |
| 10 | 3.00 | 0 | 0 | 0 | 0 | 0 |
| 11 | 1.17 | 0.20 | 0 | 1.15 | 0.47 | 0 |
| 12 | 2.35 | 0.65 | 0 | 0 | 0 | 0 |
| 13 | 2.01 | 0 | 0.99 | 0 | 0 | 0 |
| 14 | 1.92 | 1.07 | 0 | 0 | 0 | 0 |
| 15 | 0.61 | 0.21 | 0 | 1.19 | 0.99 | 0 |
| 16 | 1.39 | 0.24 | 0 | 1.36 | 0 | 0 |
| 17 | 1.52 | 0 | 1.49 | 0 | 0 | 0 |
| 18 | 1.43 | 0 | 0 | 1.57 | 0 | 0 |
| 19 | 1.91 | 0 | 0 | 1.09 | 0 | 0 |
| 20 | 1.00 | 0 | 0 | 1.10 | 0.91 | 0 |
| 21 | 1.01 | 0.18 | 0 | 0.99 | 0.82 | 0 |
| 22 | 0.98 | 0.89 | 1.07 | 0.06 | 0 | 0 |
| 23 | 0.58 | 0 | 0.79 | 0.68 | 0.95 | 0 |
| 24 | 1.44 | 0 | 0 | 0.83 | 0 | 0.73 |
| 25 | 1.17 | 0 | 0.99 | 0 | 0 | 0.84 |
| 26 | 0.75 | 0 | 0 | 0.43 | 1.44 | 0.38 |

TABLE 1b

Activity of the catalysts according to Examples 1–26 in the oxidation of propane (200 mg of catalyst, volume flow 6 ml/min, 0.1% propane, 20% $O_2$ in He)

| Example No. | Degree of propane conversion/% | | |
|---|---|---|---|
| | 50° C. | 100° C. | 150° C. |
| 1 | 11 | 37 | 84 |
| 2 | 7 | 34 | 84 |
| 3 | 12 | 33 | 68 |
| 4 | 12 | 33 | 68 |
| 5 | 4 | 32 | 81 |
| 6 | 9 | 32 | 83 |
| 7 | 10 | 31 | 80 |
| 8 | 16 | 30 | 70 |
| 9 | 9 | 30 | 60 |
| 10 | 12 | 30 | 75 |
| 11 | 4 | 30 | 67 |
| 12 | 15 | 29 | 78 |
| 13 | 1 | 29 | 62 |
| 14 | 2 | 29 | 70 |
| 15 | 12 | 29 | 67 |
| 16 | 13 | 28 | 59 |
| 17 | 9 | 28 | 58 |
| 18 | 2 | 25 | 72 |
| 19 | 1 | 24 | 60 |
| 20 | 5 | 24 | 65 |
| 21 | 1 | 24 | 56 |
| 22 | 2 | 22 | 58 |
| 23 | 3 | 22 | 66 |
| 24 | 4 | 21 | 55 |
| 25 | 5 | 21 | 61 |
| 26 | 1 | 20 | 58 |

EXAMPLES 27–29

Catalysts containing 3% by weight of Ru on different carrier materials each were manufactured by means of an impregnation process analogous to Example 1, and tested for the oxidation of propane. The carrier materials $TiO_2$ and $Al_2O_3$ resulted in catalysts which were active at low temperatures already.

TABLE 2

Influence of the carrier material on the activity in the oxidation of propane (3% by weight Ru/carrier each; 200 mg of catalyst, 6 ml/min, 0.1% propane, 20% $O_2$ in He)

| Example No. | Carrier | Degree of propane conversion/% | | |
|---|---|---|---|---|
| | | 50° C. | 100° C. | 150° C. |
| 27 | $TiO_2$ (Degussa Aerolyst) | 12 | 30 | 81 |
| 28 | $TiO_2$ (Degussa P25) | 5 | 27 | 59 |
| 29 | $Al_2O_3$ (Kalichemie Aluperl) | 9 | 19 | 28 |

EXAMPLES 30–49

Catalysts containing 3% by weight of Ru on $TiO_2$ (Degussa Aerolyst) were manufactured by means of an impregnation process as described in Example 1. After drying, they were doped with a second metal in the amount of 0.3% by weight each by means of impregnation with aqueous solutions of metallic salts, dried again, calcined and reduced. In the oxidation of propane, the catalysts doped with Pt, Pd, Rh, Au, Mn, Re, Bi, Te, Mo, Pb or rare earth metals showed an increased activity at low reaction temperatures compared to the non-doped Ru catalysts.

TABLE 3

Catalyst composition and activity of doped Ru/TiO$_2$ catalysts in the oxidation of propane (200 mg of catalyst, 6 ml/min, 0.1% propane, 20% O$_2$ in He)

| Example No. | Active components | Degree of propane conversion/% 100° C. |
|---|---|---|
| 30 | 3% by weight Ru | 30 |
| 31 | 3.3% by weight Ru | 32 |
| 32 | 3% by weight Ru, 0.3% by weight Pt | 35 |
| 33 | 3% by weight Ru, 0.3% by weight Pd | 37 |
| 34 | 3% by weight Ru, 0.3% by weight Rh | 36 |
| 35 | 3% by weight Ru, 0.3% by weight Au | 36 |
| 36 | 3% by weight Ru, 0.3% by weight Mn | 41 |
| 37 | 3% by weight Ru, 0.3% by weight Re | 39 |
| 38 | 3% by weight Ru, 0.3% by weight La | 33 |
| 39 | 3% by weight Ru, 0.3% by weight Ce | 34 |
| 40 | 3% by weight Ru, 0.3% by weight Nd | 36 |
| 41 | 3% by weight Ru, 0.3% by weight Sm | 33 |
| 42 | 3% by weight Ru, 0.3% by weight Gd | 34 |
| 43 | 3% by weight Ru, 0.3% by weight Bi | 54 |
| 44 | 3% by weight Ru, 0.3% by weight Te | 42 |
| 45 | 3% by weight Ru, 0.3% by weight Mo | 40 |
| 46 | 3% by weight Ru, 0.3% by weight Pb | 42 |
| 47 | 3% by weight Ru, 0.3% by weight Ge | 30 |
| 48 | 3% by weight Ru, 0.3% by weight Cr | 43 |
| 49 | 3% by weight Ru, 0.3% by weight Zn | 31 |

EXAMPLES 50–57

Catalysts containing 3% by weight of Ru on TiO$_2$ (Degussa Aerolyst) were provided with different amounts of Mn by means of an impregnation process, as described in Examples 30–49. The catalysts containing Mn were considerably more active in the oxidation of propane than the catalysts containing solely Ru, wherein a maximum activity was achieved at Mn contents of 3.0% by weight and more.

TABLE 4

Catalyst composition and activity in the oxidation of propane (200 mg of catalyst, 6 ml/min, 0.1% propane, 20% O$_2$ in He)

| Example No. | Active components | Degree of propane conversion/% | | |
|---|---|---|---|---|
| | | 50° C. | 100° C. | 150° C. |
| 50 | 3% by weight Ru | 14 | 28 | 69 |
| 51 | 3% by weight Ru | 13 | 26 | 61 |
| 52 | 3% by weight Ru, 0.01% by weight Mn | 17 | 27 | 71 |
| 53 | 3% by weight Ru, 0.1% by weight Mn | 17 | 33 | 78 |
| 54 | 3% by weight Ru, 0.3% by weight Mn | 17 | 46 | 95 |
| 55 | 3% by weight Ru, 0.7% by weight Mn | 19 | 41 | 87 |
| 56 | 3% by weight Ru, 1% by weight Mn | 17 | 43 | 94 |
| 57 | 3% by weight Ru, 1.5% by weight Mn | 18 | 45 | 86 |

EXAMPLE 58

2.39 g of ruthenium(III) acetyl acetonate were dissolved in 650 ml of toluene, and added to 60 g of Al$_2$O$_3$ (Degussa Aluminiumoxid C) while stirring. After the mixture had been stirred for 1 hour at 20° C., it was left at room temperature for several days until the solvent had evaporated. 200 mg of the catalyst were calcined in air for 2 hours at 400° C., and subsequently reduced in a hydrogen flow for 2 hours at 250° C. In the following test, 44% of the propane were converted into CO$_2$ at 50° C., 52% at 100° C., and 80% at 150° C. A long-term test at 22° C. showed that the catalyst worked for 8 hours without any loss of activity (Table 5).

TABLE 5

Long-term test at 22° C. using 1% by weight of Ru/Al$_2$O$_3$ according to Example 58, activity in the oxidation of propane (200 mg of catalyst, 6 ml/min, 0.1% propane, 20% O$_2$ in He)

| Time/h | X/% |
|---|---|
| 0.5 | 38 |
| 1.0 | 41 |
| 1.5 | 43 |
| 2.0 | 42 |
| 2.5 | 42 |
| 3.0 | 43 |
| 3.5 | 43 |
| 4.0 | 42 |
| 4.5 | 42 |
| 5.0 | 41 |
| 5.5 | 42 |
| 6.0 | 42 |
| 6.5 | 42 |
| 7.0 | 41 |
| 7.5 | 42 |

The invention claimed is:

1. A method for removing traces of hydrocarbons from gas flows:
   passing a flow of a nitric oxide-free gas containing traces of hydrocarbons in the range of 0.1 to 2,000 ppm over a catalyst while adding molecular oxygen and at a temperature in the range of 20 to 150° C.,
   wherein said catalyst comprises a carrier material having a specific BET surface area of 1 to 1500 m$^2$/g and at least one catalytic component on the surface of said carrier material, said at least one catalytic component is selected from the group consisting of:
   a) a share from 0.1 to 20% by weight of ruthenium relative to the total weight of the catalyst; and
   b) ruthenium and elements selected from the group consisting of bismuth, lead, molybdenum, manganese, tellurium, chromium, and combination thereof.

2. A method according to claim 1, wherein the carrier material of the catalyst is selected from the group consisting of titanium dioxide, titanium silicalite, aluminium oxide, alumosilicates, manganese oxides, magnesium oxide, acid zirconium dioxide and mixtures thereof.

3. A method according to claim 2, wherein the carrier material is TiO$_2$ having the modification anatase in the amount of 20–100% by weight.

4. A method according to claim 2, wherein the carrier material is Al$_2$O$_3$.

5. A method according to claim 1, wherein the ruthenium content is in the range of 0.5 to 5% by weight, particularly 0.5 to 3% by weight.

6. A method according to claim 1, wherein the content of traces of hydrocarbons in the gas flows is in the range of 10 to 2,000 ppm, preferably 10 to 1,000 ppm.

7. A method according to claim 1, wherein oxygen in the form of air is supplied to the gas flow.

8. A method according to claim 1, wherein the hydrocarbons contained in the gas flows comprises propane in a concentration of up to 1,000 ppm, and the temperature is maintained in the range of 50 to 150° C.

9. A method for removing traces of hydrocarbons from gas flows comprising:
passing a flow of a nitric oxide free gas containing traces of hydrocarbons in the range of 0.1 to 2,000 ppm over a catalyst while adding molecular oxygen and at a temperature in the range of 20 to 150° C.;
wherein the catalyst includes a base body of $TiO_2$ and at least one catalytic component on the surface of said base body, said base body has the modification anatase and a specific BET surface of 1 to 1,500 $m^2/g$ and said at least one catalytic component is selected from the group consisting of a) ruthenium from 0.1 to 20% by weight relative to the total weight of the catalyst; and b) ruthenium and elements selected from the group consisting of bismuth, lead, molybdenum, manganese, tellurium, chromium, and combination thereof.

* * * * *